United States Patent [19]
Borre et al.

[11] 3,751,232
[45] Aug. 7, 1973

[54] MEANS FOR EFFECTING A MULTIPLE STAGE CONTACT OF A REACTANT STREAM

[75] Inventors: Henry C. Borre, Mt. Prospect, Ill.; Wayne N. Root, Statesville, N.C.

[73] Assignee: Universal Oil Products Company, Des Plaines, Ill.

[22] Filed: Jan. 14, 1971

[21] Appl. No.: 106,512

[52] U.S. Cl............ 23/288 R, 23/288 K, 208/48 Q, 260/669 R, 423/659
[51] Int. Cl........................... B01j 9/04, C07c 15/10
[58] Field of Search....................... 23/288 R, 288 K, 23/288 F, 289, 1 B; 260/669 R, 690, 684; 208/48 Q; 196/127; 48/94, 105, 196

[56] References Cited
UNITED STATES PATENTS

| | | | |
|---|---|---|---|
| 3,498,755 | 3/1970 | Borre | 23/288 R |
| 3,061,416 | 10/1962 | Kazokas | 23/288 F |
| 3,361,839 | 1/1968 | Lester | 260/669 R |

FOREIGN PATENTS OR APPLICATIONS

| | | | |
|---|---|---|---|
| 555,787 | 9/1943 | Great Britain | 23/288 R |
| 792,827 | 4/1958 | Great Britain | 23/288 R |
| 1,293,205 | 4/1962 | France | 23/288 R |

Primary Examiner—Joseph Scovronek
Attorney—James R. Hoatson, Jr. and Ronald H. Hausch

[57] ABSTRACT

Method and apparatus for effecting a multiple stage contact to a reactant stream such as a multistage dehydrogenation of ethylbenzene to styrene. The reaction feed stream is passed alternately in outward and inward radial flow directions through a plurality of adjacent annular reaction zones and withdrawn from intermediate reaction zones and channeled to mixing zones longitudinally adjacent the next successive annular reaction zones. A heat exchange medium is introduced into such mixing zones in a manner effecting both a downstream flow thereof to the next reaction zone and mixing with the reactant stream.

1 Claim, 2 Drawing Figures

PATENTED AUG 7 1973   3,751,232

INVENTOR:
Henry C. Borre
Wayne N. Root
BY: James R. Hoatson, Jr.
Ronald H. Hausch
ATTORNEYS

MEANS FOR EFFECTING A MULTIPLE STAGE CONTACT OF A REACTANT STREAM

The present invention is directed to the improved means and method for effecting the multiple stage contact of a reactant stream and more particularly to a system which utilizes an intermediately introduced heat exchange stream to provide mixing effect with reactant stream flow between contact stages.

There have been various types of multiple stage reactors used in the petroleum and chemical processing fields. Also, there have been various designs and arrangements for effecting the introduction of the heating or cooling medium into a reactor chamber at successive contact stages; however, it is believed that the conventional constructions have not made use of a design where the heat exchange medium is utilized as efficiently as in the present invention. For example, in carrying out an endothermic conversion such as the dehydrogenation of ethylbenzene, there are two processing problems which have been encountered. One problem of course resides in the need to replace heat for the endothermic reaction taking place in the conversion zones, while the other problem resides in the need to have a minimization of pressure drop, particularly where the operation is being carried out at very critical pressures. On the other hand, hydrocracking and hydrogenation operations which are exothermic are optimally carried out for use of intermediate additions of cooler hydrogen stream, or with suitable quench stream between stages in order to maintain a control of temperature throughout the overall reaction zone. Again, an improved operation can result if there is a special provision for introducing the cooling system in a manner to reduce pressure drop for the reactant stream flow.

Thus, it may be considered a principal object of the present invention to provide for the multiple stage contacting of a reactant stream, with such stream passing alternately in outward and inward radial flow directions through a plurality of adjacent annular reaction zones and channeling the partially contacted reactant stream from each intermediate reaction zone to a mixing zone longitudinally adjacent to the next successive reaction zone and introducing a heat exchange medium into the mixing zone in a manner effecting both a downstream flow thereof and a mixing with the reactant stream, whereby to reduce the pressure drop in the system.

In a broad aspect, the present invention embodies effecting the multiple stage contact and conversion of the reactant stream with a heat exchange being effected between contact zones in an improved manner which comprises, passing a feed stream alternately in outward and inward radial flow directions through a plurality of adjacent annular reaction zones; withdrawing the feed stream from each intermediate annular reaction zone and channeling the partially contacted reactant stream to a mixing zone longitudinally adjacent to a next successive annular reaction zone; introducing a heat exchange medium into each mixing zone in a manner effecting both a downstream flow thereof and a mixing with the reactant stream; introducing the admixture of heat exchange medium and reactant stream into a next successive annular reaction zone for further conversion therein; and, subsequently withdrawing a resulting contact reactant stream at the downstream end of the last of the plurality of annular reaction zones of contact material.

In operating an endothermic reactor zone such as with the ethylbenzene dehydrogenation, there can be the introduction of high temperature super-heated steam into the mixing zones of the process unit between the various zones of the reactor such that there is a resulting downstream directional flow which can educt and "repressure" partially cooled reactant stream from an adjacent upstream contact zone. The eduction-mixing then provides a reheated reactant stream flow into the inlet portion of the next adjacent downstream annular contact section. By operating in accordance with the practice of this invention, it was found that the temperature decrease through a given reaction zone was minimized with the result that less additional super-heated steam was needed to be added to the effluent when compared with the prior art schemes. Additionally, the use of the radial flow achieves less pressure drop through the overall reaction system than would otherwise be obtained, because of shallower contact zones required, thereby minimizing the pressure at which the reactants needed to be introduced at the first reaction zone and reducing the amount of catalyst necessary to effectuate the reduction. Furthermore, introducing the reactant stream radially through annular reaction zones establishes conditions that approximate an isothermal reaction zone because of the large entrance surface area and shallow depth of the reaction zone. Thus, it is possible to maintain nearly ideal reaction temperatures throughout the zones.

As another embodiment, the present invention may be considered to provide an elongated pressure-tight chamber; a first elongated perforated tubular-form section coaxially disposed within said chamber to form a tubular manifold means; a second elongated perforated tubular-form section coaxially disposed within said chamber and spaced outwardly from said first tubular-form section to form an annular catalytic contact material section therebetween, said second perforated tubular-form section being spaced within said chamber to form a resulting annular manifold means between the second tubular-form section and the walls of said chamber; at least one imperforate laterally disposed partition means within one of said manifolds of said chamber for dividing said reactor into at least two contact stages; heat exchange fluid inlet means for each partition means used in said chamber and positioned in the other manifold means at about the same level as such partition means for discharging a heat exchange fluid into the fluid stream before reentry of said fluid into the next successive contact stage, whereby there is a mixing of the fluid from the upstream contact stage and heat exchange fluid in the other manifold means prior to reentry into such next successive contact stage of catalyst contact material section; inlet means connected to the portion of the manifold means located upstream of the first contact stage of said reactor for introducing the feed stream therein; and, outlet means connected to the portion of the manifold means located downstream of the last contact stage of said reactor for withdrawing the reacted feed stream therefrom.

Preferably, the heat exchange fluid inlet means includes a nozzle discharge means directed to the downstream direction and preferably of a Venturi type whereby the downstream flow of the reactant fluid is enhanced to effect minimization of pressure drop for the entire multiple stage unit. The heat exchange fluid, either a heating or cooling medium, may be introduced through a single inlet conduit when being introduced into the central tubular manifold means or on the other hand a plurality of inlet pipes spaced at equal intervals around the circumference of the annular form manifold means.

Reference to the accompanying drawing will serve to diagramatically illustrate the present improved method of operation and the reactor construction, while the description in connection therewith will, in addition, point out further advantageous features relative to the design and operation of the multiple stage reactor.

Figure 1:
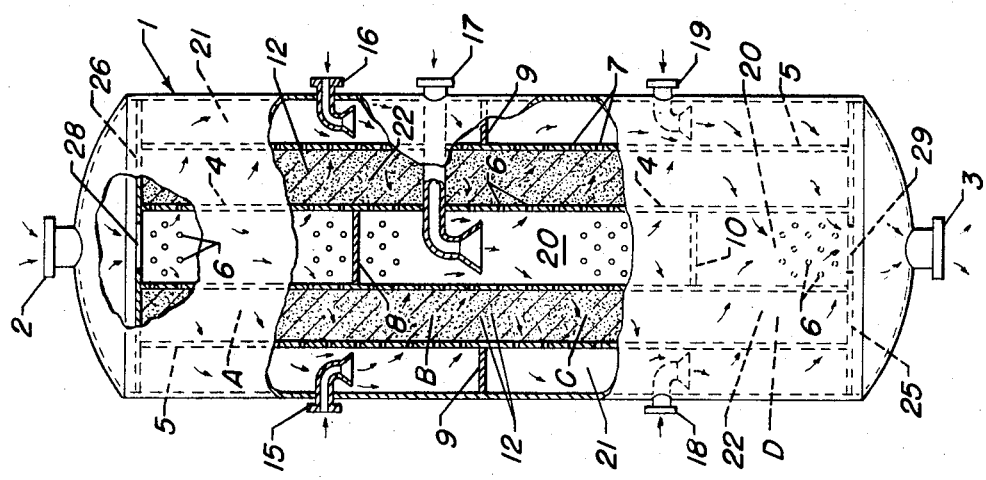
FIG. 1 is an elevational view, shown partially in section, of a reactor of the present invention having four annular-shaped reactor zones.

Referring now more particularly to FIG. 1 of the drawing, there is shown an elongated pressure-type chamber 1 having a fluid inlet means 2 at the upper end portion thereof and a reaction product outlet means 3 at the lower end portion thereof. Disposed within chamber 1 is a first elongated perforated tubular form section 4 which forms a tubular manifold 20. A second elongated perforated tubular form section 5 is coaxially disposed within chamber 1 and spaced outwardly from the first perforated section 4 to form an annular catalytic contact material section 22 therebetween. The second elongated perforated tubular-form section 5 is spaced within the chamber to form a resulting annular manifold 21 between the walls of chamber 1 and section 5. Of course, perforated sections 4 and 5 have a multiplicity of perforations or openings 6 and 7 to provide for communication between the manifold sections and the catalyst contact material 12 within the catalyst material section 22. Openings 6 and 7 are of course sized to retain the catalyst material 12 within section 22 and also to permit passage of fluid therethrough without creating extreme pressure drops. This particular reactor is divided into four stages by means including imperforate partitions 8 and 10 located within perforate section 4 and annular imperforate partition 9 located in the annular manifold 21. Partitions 8, 9, and 10 serve to divide manifolds but in doing so divide the contact material section 22 into four zones or stages ABCD. In other words, partition 8 is positioned to direct the fluid stream upstream of partition 8 radially outwardly through a portion of the contact material section 22 above partition 8 and indicated by the letter A. Likewise, partition 9 divides the radial form manifold section 21 and in so doing directs the fluid stream upstream of partition 9 radially inward through a portion of the contact material section designated by the letter B. Partition 10 divides the manifold section 20 and in so doing directs the fluid stream upstream of the perforate partition 10 radially outward through the contact material section designated by the letter C. Of course, an end closure plate 25 is provided to direct the flow in the downstream portion of manifold 21 radially through the portion of the contact material section designated by D into the inner tubular-form manifold section 20.

For each partition used there is provided heat exchanged fluid inlet means which is disposed in the other manifold at about the same level as such partitions. In other words heat exchange inlets 15 and 16 are provided in annular manifold 21 at about the same level as partition 8; heat exchange inlet 17 is provided in manifold 20 at about the same level as partition 9; and inlets 18 and 19 are provided in manifold 21 at about the same level as partition 10. These inlets discharge a heat exchange fluid into the fluid stream before reentry of the fluid stream into a downstream portion of catalyst material section. Preferably, the heat exchange fluid inlets include nozzle discharge means directed in the downstream direction which are of a Venturi type to thus aid in educting the fluid from the contact material section upstream of each nozzle. More than two nozzles may be provided at each level, especially when located in the annular manifold. When such is the case the preferred deposition is equal intervals for most efficient eduction and mixing.

A top closure plate 26 is provided at the upper end of the reaction chamber to prevent the premature entry of fluid into the outer radial-form manifold section 20 as well as into the catalyst retaining section 22. Openings 28 and 29 are provided in plates 26 and 25 to establish communication between the inlets 2 and the upstream portion of manifold 20 and between outlet 3 and the downstream portion of manifold 20.

The contact material section 22 has disposed therein the catalyst material 12 or other suitable contact material to assist in carrying out the particular conversion or treating operation. It is noted that the catalyst retaining section 22 is continuous and has no partitions therein. This facilitates the filling and refilling as well as emptying of the catalyst particles when desired. In previous multistage contact chambers catalyst material would have to be taken from each individual reaction zone whereas in the present invention only one emptying procedure is required to evacuate and fill all four zones.

By way of explanation, in connection with a high temperature endothermic reaction, such as with the dehydrogenation of ethylbenzene to produce styrene, there may be utilized super-heated steam as a heating medium for the conversion. The feed stream of ethylbenzene, including some portion of super-heated steam is passed alternatively in outward and inward radial flow directions through zones A through D. The initial temperature of the feed stream entering inlet 2 will be of the order of approximately 1,100° F. The partially contacted feed stream is withdrawn from each intermediate zone A, B, and C and channeled to the mixing zones of the manifolds 20 and 21 longitudinally adjacent the next successive annular reaction zones B, C, and D, respectively. The super-heated steam is introduced by way of the heat exchange inlet means 15, 16, 17, 18, and 19 at the temperature of the order of approximately about 1,400° F. and in a downstream direction through the unit so as to enhance the flow of the hydrocarbon vapors flowing from the catalyst material section 22. At the same time there is effected a reheating of the vapors to a desired temperature which may be of the order of about 1,100° F. as they leave the longitudinal mixing sections adjacent the downstream portions of the retaining section. At successive downstream stages, the super-heated steam may be at higher temperatures so as to gradually increase the temperature of the reactant stream as it progresses from stage to stage through the entire multiple stage reactor unit. Generally, this dehydrogenation reaction will be carried out at a low pressure of the order of about 10 psig or preferably slightly lower. Thus, it may be seen that pressure drop through successive zones of the contact material will be a problem unless means is taken to effect education such as provided by the present invention.

As hereinbefore noted, it is not intended to limit the present improved type of operation or improved apparatus arrangement to any one system inasmuch as there are various types of conversions or treating steps which may be carried out in accordance with the present improved apparatus. In the case of exothermic operations, such as hydrogenation, a relatively cool hydrogen steam may be introduced through each of the inlet nozzles 15, 16, 17, 18, and 19 so that a relatively cool educting stream is provided to provide the dual function of mixing with the reactant stream flow in the successive mixing zones adjacent the contact material section, as well as assist in educting reactant stream flow from one zone to the next and thus effect a decrease in the overall pressure drop through the multiple stage unit.

Figure 2:
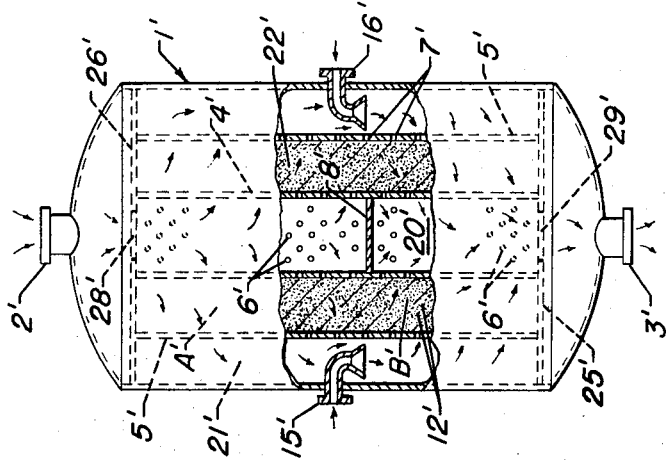
FIG. 2 is an elevational view, shown partially in section, of a reactor of this present invention having two annular reactor zones.

Various modifications may of course be made with respect to the structural features shown in the present embodiment without departing from the scope of the present invention. For instance, in FIG. 2 there is shown a reactor having two annular shaped reaction zones formed in a similar manner as the embodiment of FIG. 1. The difference in the embodiment of FIG. 2 is basically of size and number of partitions and inlet heat exchange means used. The numerals used to designate various parts of the reactor of FIG. 2 are primed to show the corresponding features of FIG. 1. The smaller reactor may be utilized quite effectively either singularly or in series of two or more like reactors.

From the foregoing description it is readily seen that the present invention provides for the multiple stage contacting of a reactant stream, with such stream passing alternatively in outward and inward radial flow directions through a plurality of adjacent annular reaction zones, with a heat exchange medium being introduced between intermediate zones in a manner effecting a downstream flow and an education mixing with the reactant stream. The use of the radial flow and "repressuring" concept achieves less pressure drop through the overall reaction system than would otherwise be possible. In addition, less heat exchange medium is required than with prior art schemes.

I claim:

1. A multiple stage reactor unit for effecting a conversion of a fluid stream in the presence of a catalytic contact material which comprises in combination:
    a. an elongated pressure-tight chamber;
    b. a first elongated perforated tubular-form section coaxially disposed within said chamber to form a tubular manifold in the chamber;
    c. a second elongated perforated tubular-form section coaxially disposed within said chamber and spaced outwardly from said first tubular-form section to form an annular catalytic contact material section therebetween, said second perforated tubular-form section being spaced within said chamber to form a resulting annular manifold between the second tubular-form section and the walls of said chamber;
    d. an imperforate laterally disposed partition within each of said tubular manifold and said annular manifold, said partitions being spaced longitudinally from each other and dividing said reactor into a series of successive catalytic contact stages through which said fluid stream is passed alternately in outward and inward radial flow directions;
    e. a heat exchange fluid inlet positioned in said annular manifold at about the same level as the partition disposed in the tubular manifold and a heat exchange fluid inlet positioned in said tubular manifold at about the same level as the partition in said annular manifold for discharging a heat exchange fluid into the fluid stream before reentry of said stream into the next successive contact stage, whereby there is a mixing of fluid from the upstream contact stage with heat exchange fluid in each manifold prior to reentry of said fluid from the upstream contact stage into the next successive contact stage;
    f. inlet means connected to the portion of the tubular manifold located upstream of the first contact stage of said reactor for introducing the feed stream thereto; and,
    g. outlet means connected to the portion of the tubular manifold located downstream of the last contact stage of said reactor for withdrawing the reacted feed stream therefrom.

\* \* \* \* \*